United States Patent Office 3,513,828
Patented May 26, 1970

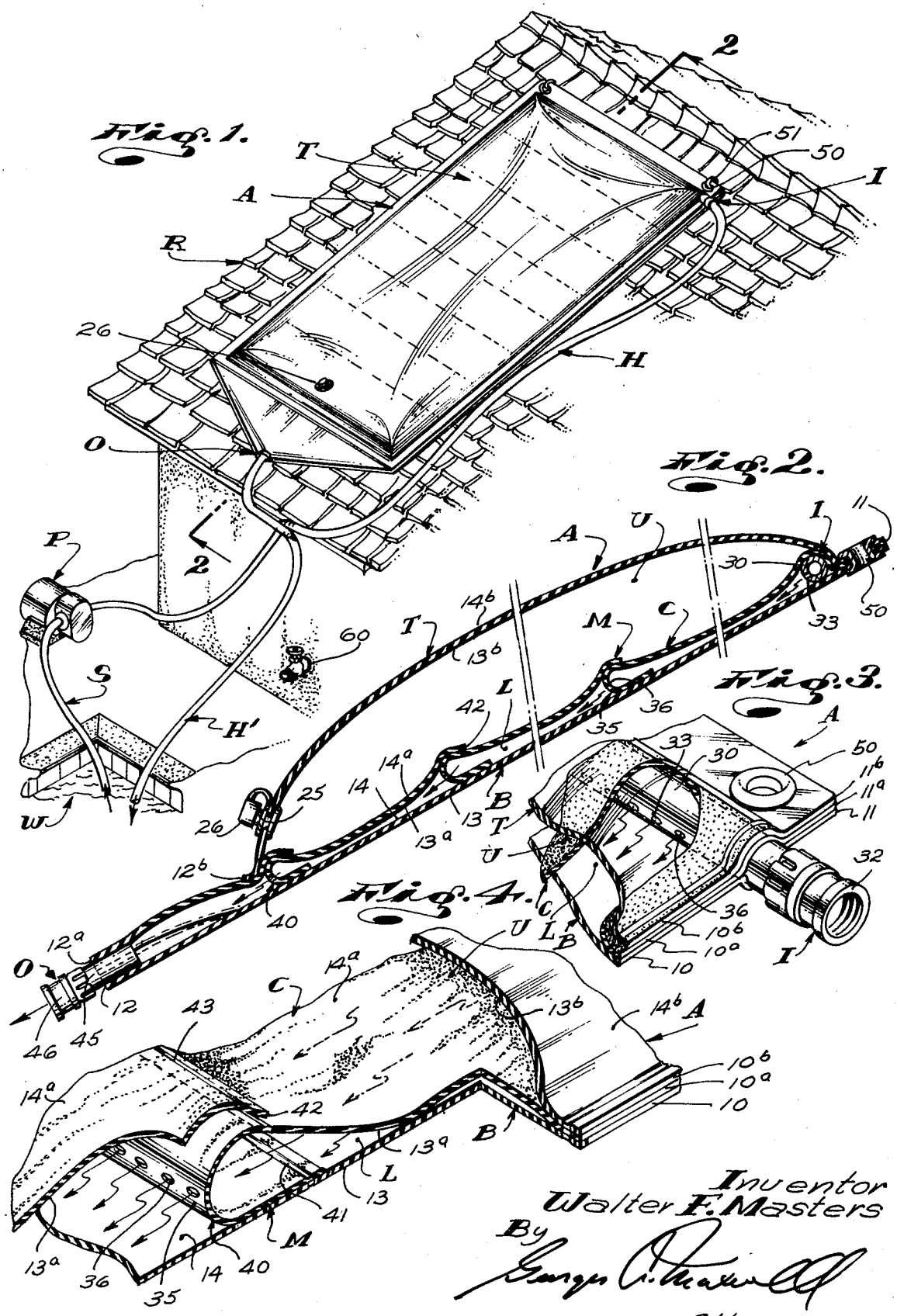

3,513,828
SOLAR WATER HEATER
Walter F. Masters, 3217 Lakeshore Court,
Orlando, Fla. 32803
Filed Nov. 4, 1968, Ser. No. 772,927
Int. Cl. F24j 3/02
U.S. Cl. 126—271                                    10 Claims

ABSTRACT OF THE DISCLOSURE

A solar water heater to be engaged on an inclined roof structure and comprising three superimposed sheets, there being an elongate base sheet with a heat reflecting top surface and having upper and lower ends, a black, flexible heat absorbing central sheet, and a transparent solar radiation conducting top sheet, the space between the central and the top sheets being filled with air so the top sheet is spaced from the central sheet, water inlet means connected with a water supply and conducting water between the base and central sheets at the upper end of the structure, irrigating means spaced longitudinally of the structure to maintain water dispersed laterally between the bottom and central sheets as it flows longitudinally therebetween and water discharge means at the lower end of the structure.

---

This invention has to do with a solar water heater and is more particularly concerned with a novel water heater construction having novel means for distributing water across the surface of a solar heat absorbing and conducting membrane and novel means insulating the heat absorbing and conducting membrane from ambient air or adverse atmospheric conditions.

It is an object and feature of my invention to provide a solar water heater of the character referred to which is particularly adapted for installation on an inclined or pitched roof top and which includes a flat envelope-like structure with a bottom sheet of flexible plastic material, which is related to inclined supporting surfaces such as a roof top, an intermediate heat absorbing sheet of flexible plastic material above the bottom sheet, irrigating means to conduct and direct water between the bottom and intermediate sheets and a top, insulating sheet of clear, flexible, plastic material in spaced relationship above the intermediate sheet.

Another object and feature of this invention is to provide a structure of the general character referred to having upper and lower ends, water inlet and outlet means at said upper and lower ends and a structure wherein said top and intermediate sheets establish an inflatable structure, which defines a body of dead insulating air between the top and intermediate sheets which body of air maintains the top sheet spaced above the intermediate sheet.

Yet another object of my invention is to provide a structure of the character referred to wherein the irrigating means includes a plurality of longitudinally spaced, laterally extending partitions between the bottom and intermediate sheets, which partitions catch waters flowing downwardly between the sheets, distribute the water laterally between the sheets and are provided with laterally spaced apertures through which the water trapped by each partition flows to flow longitudinally downwardly between the sheets downstream of the partitions.

Yet another object of my invention is to provide a heater of the character referred to which is particularly adapted for heating the water in a swimming pool and which includes a pumping means to draw water from the pool and deliver it to the water inlet means at the upper end of the heater and which includes means at the lower discharge end of the heater to conduct heated water back into the pool.

It is an object of this invention to provide a structure of the character referred to wherein the filter pump for the swimming pool can be utilized to supply the water to the heater.

It is another object of my invention to provide a heater of the character referred to which is easy and economical to manufacture, a structure which is easy and convenient to install and operate, and a structure which is highly effective and dependable in operation.

The foregoing and other objects and features of my invention will be fully understood from the following detailed description of a typical preferred form and application of my invention, throughout which description reference is made to the accompanying drawings, in which:

FIG. 1 is a perspective view of my new heater, showing it related to a swimming pool and roof top;

FIG. 2 is an enlarged, detailed sectional view taken substantially as indicated by line 2—2 on FIG. 1;

FIG. 3 is an enlarged perspective view of a portion of my invention with portions broken away to better illustrate details of the construction; and FIG. 4 is a perspective view of another portion of my invention with portions broken away and in section to better illustrate the details of the construction.

The heater construction A that I provide includes an elongate, flat, substantially rectangular base sheet B of flexible plastic material arranged with its major longitudinal axis on an inclined plane, said base sheet having straight, parallel side edges 10, a straight, transversely extending top or upper edge 11, a bottom or lower edge 12, a flat, substantially downwardly disposed support engaging surface 13 and a flat, substantially upwardly disposed top surface 14. The bottom or lower edge 12 is preferably V-shaped and has longitudinally outwardly or downwardly convergent edge portions which join at or near the central, longitudinal axis of the sheet.

The construction further includes a central or intermediate sheet C of flexible heat absorbing plastic material, which sheet can be a unitary plastic sheet or can, as illustrated, be fabricated of a multiplicity of pieces of plastic sheeting, as will hereinafter be described.

The sheet C corresponds, generally, in size, shape and disposition with the base sheet B and has side, top and bottom edges 10$^a$, 11$^a$ and 12$^a$. The sheet C is arranged to occur above and overlie the sheet B with its several edges aligned with the several corresponding edges of the sheet B.

The sheet C has a bottom surface 13$^a$ which opposes the top surface 14 of sheet B and has a substantially flat, upwardly disposed top surface 14$^a$.

The construction further includes a top or cover sheet T of clear, transparent, solar radiation conducting, flexible plastic, which sheet can correspond in general size, shape, and disposition with the sheets B and C and has side, top and bottom edges 10$^b$, 11$^b$ and 12$^b$. The sheet T is arranged to occur above and overlie the sheet C with its side and top edges 10$^b$ and 11$^b$ aligned with the corresponding edges 10–10$^a$ and 11–11$^a$ of the sheets B and C.

The bottom edge 12$^b$ of the sheet T is shown as having a straight, transversely extending edge, extending straight across the structure and between the lower ends of the side edges 10$^b$.

The sheet T has substantially flat bottom and top surfaces 13$^b$ and 14$^b$.

The several adjacent side edge portions of the sheets A, B and T are suitably secured and sealed together, as at 20 and 21, and so that the sheets B and C cooperate to define a lower chamber L and the sheets C and T cooperate to define an upper chamber U.

In practice, the sheets can be fixed and sealed together by means of a suitable cement, heat sealing or a combination thereof.

The top sheet T is provided with an air conducting stem 25 with a closure 26 removably related to it to facilitate introducing air into the upper chamber U and thereby inflate the construction and to urge and maintain the top sheet T in spaced, insulated relationship from the central sheet C, as clearly illustrated in the drawings.

The sub-assembly made up of the top and central sheets T and C need only be inflated to about 2 or 3 p.s.i. and so that the air within the chamber U is not compressed greatly and so dense as to adversely increase its heat conducting characteristics.

The construction that I provide further includes water inlet means I, irrigating or water dispersing means M and water outlet means O.

The water inlet means I is shown as including an elongate manifold 30 extending transversely across the upper end of the chamber L and having an outer end portion 31 extending laterally outwardly between the sheets B and C and provided with a hose coupling 32 at its outer end.

The manifold 30 is shown as being established by a length of plastic hose or pipe and is provided with a plurality of longitudinally spaced apertures 33, which apertures are disposed longitudinally downwardly relative to the longitudinal axis of the construction and are adapted to dispense and distribute water flowing into and through the manifold substantially uniformly across the lateral extent of the construction and between the sheets B and C.

The sheets B and C are fixed and sealed to and about the portion of the manifold pipe 30 which extends between the edge portions of the said sheets and so that the construction is suitably closed or sealed.

The dispersing or irrigating means M includes a plurality of longitudinally spaced, transversely extending perforated partitions 35 between the sheets B and C, which partitions are adapted to catch and collect water as it flows downwardly between the sheets and to redistribute it laterally and across the plane of the construction as it flows downwardly from each partition.

In the case illustrated, the partitions 35 are provided with a single row of perforations 36.

If the central sheet C is a single sheet of plastic, the partitions 35 can be established of individual perforated strips of sheet plastic arranged between the sheets B and C and having top and bottom edge portions heat sealed or otherwise fixed to the sheets B and C.

In the case illustrated, the central sheet C is made up of a plurality of longitudinally spaced sections and the partitions 35 are established by downwardly and rearwardly turned, perforated lower edge portions 40 on each section, the lower rear edges of which are heat sealed or otherwise fixed to the bottom sheet B as indicated at 41.

The upper, rear, transverse edge 42 of each lower section extends over the downwardly turned partition forming portion of its related upper section and is heat sealed or otherwise fixed to the top of the said related upper section as at 43.

In operation, the central sheet, whether integral or sectional normally lies on the bottom sheet B and is urged downwardly by the air pressure in the upper chamber U. Water introduced into the upper end of the lower chamber L and flowing downwardly between the sheets B and C is normally caused to be pressed and spread out between the sheets by the air pressure in the chamber U acting upon the sheet C.

In spite of the above, there still exists the tendency for the downwardly flowing water to establish channels between the sheets B and C and along or through which the water might rush and flow too rapidly and directly down or longitudinally of the construction.

The portions 35 of the means M serve to prevent channeling of the water in the manner set forth above and assure proper spread and distribution of the water flowing downwardly between the sheets B and C.

The water outlet means includes a short longitudinally extending open ended outlet tube 45 arranged centrally of the construction and extending between the edges of the sheets B and C, with the upper, inner end communicating with the lower end of the chamber L and provided with a hose fitting 46 at its other or outer lower end.

In practice, suitable means are provided to secure the construction to a supporting structure. In the case illustrated, the construction is arranged and supported on a pitched roof R and is shown provided with grommets 50 in its upper edge portion, which grommets are engaged about retaining hooks 51 engaged in the roof structure.

In the case illustrated, the water inlet means I is shown connected with the discharge side of a water recirculating pump P by means of a supply hose H connected with the hose fitting 32. The inlet side of the pump is connected with a suction hose S extending into the water W of a swimming pool.

The hose fitting 46 of the water outlet means is shown connected with a return hose H', which hose extends to the pool or water W.

In practice, when the structure provided is related to a pool construction having a filter and/or heater means, the pump P can be that pump normally provided with such means and the hose H can be connected with a suitable valve controlled T-fitting or the like arranged in the high pressure side of the piping of the filter means (not shown).

Still further, in practice, the hose H can be connected with any suitable water supply, such as a municipal water supply and by means of a hose bib 60, in which case the pump P is not required and the water being heated is fresh water, rather than recirculated water.

In the preferred carrying out of this invention, the central, intermediate, heat-absorbing sheet C is established of black, opaque, flexible, plastic sheeting. The bottom or base sheet B is preferably provided with a white or other highly reflecting top surface 14 and so that heat from the central sheet, moving downwardly through the structure is not absorbed by and conducted downwardly further by the base sheet, but is bounced or reflected back, upwardly toward the central sheet and through the water therebetween.

The ordinary or conventional roof construction with which my new heater is to be related cooperates with related building structure to define an attic or other similar air space. Such air space is in the nature of and serves as a heat sink. Solar radiation absorbed by the roof not only heats the roof, but also heats the air in the noted space below. As a result of the above, the ordinary roof and the air space therebelow defines a large and extensive heat sink which, throughout the daytime, collects many B.t.u.'s of heat energy.

In light of the above, in carrying out this invention, the bottom side 13 of the base sheet B of my heater can be black or some other dark heat absorbing color and such that it will absorb heat collected by the roof structure, on which it is engaged and supported, and such that it will conduct such heat to the water being heated.

While I have described my new heater construction as being engaged and supported by a roof structure and as being employed to heat the water of a swimming pool, it is to be noted and understood and it will be apparent that my heater can be employed to heat other than swimming pool water and that it can be engaged and supported on an inclined supporting surface other than a roof, as desired or as circumstances require and without departing from the spirit of this invention.

From the foregoing, it will be apparent that the heater structure that I provide is extremely easy and economical to manufacture and is highly effective and dependable in operation.

My heater structure is light in weight, neat and compact and is such that it can be easily and conveniently installed and put into service or taken out of service and stored away, without the exercise of any extraordinary or special skill. Finally, my heater is so light in weight and so extensive in plane configuration, that its weight, when in operation, is distributed over so great an area that it can be engaged and supported on most any roof structure without fear of overstressing or otherwise damaging the roof.

Having described only a typical preferred form and application of my invention, I do not wish to be limited or restricted to the specific details herein set forth, but wish to reserve to myself any modifications and/or variations that may appear to those skilled in the art and which fall within the scope of the following claims.

Having described my invention, I claim:

1. A solar heater construction including an elongate, flat, longitudinally inclined base sheet having upper and lower ends, a central sheet of flexible heat-absorbing material overlying the base sheet and sealed about the perimeter thereof, a top sheet of flexible, transparent, solar heat conducting material overlying the central sheet and sealed about the perimeter thereof, and defining a space filled with air therebetween whereby the top sheet is spaced above the central sheet, water inlet means at the upper end of the base sheet and including an elongate, transversely extending water conducting means with longitudinally spaced apertures communicating with the space between the base and central sheets, water distributing means including a plurality of elongate, longitudinally spaced, laterally extending partitions between the base and central sheets and having longitudinally spaced water conducting apertures and water outlet means at the lower end of the base sheet and communicating with the space between the base and central sheets.

2. A structure as set forth in claim 1 which includes an air conducting opening with a closure related thereto in the top sheet to facilitate conducting air into and out of the space between the central and top sheets.

3. A structure as set forth in claim 1 in which said central sheet is established of black, opaque plastic sheeting.

4. A structure as set forth in claim 1 in which said central sheet is established of black, opaque plastic sheeting, said heater further including an air conducting opening with a closure related thereto in the top sheet to facilitate conducting air into and out of the space between the central and top sheets.

5. A structure as set forth in claim 1 wherein said partitions are established of flexible material and said flexible central sheet normally rests upon the base sheet.

6. A structure as set forth in claim 1 in which the bottom sheet has a heat reflective top surface.

7. A structure as set forth in claim 1 in which the bottom sheet has a heat reflective top surface and the central sheet is established of black, opaque plastic sheeting.

8. A structure as set forth in claim 1 in which the bottom sheet has a heat reflective top surface, said partitions being established of flexible material and said flexible central sheet normally resting upon the base sheet.

9. A structure as set forth in claim 1 in which the bottom sheet has a heat reflective top surface and the central sheet is established of black opaque plastic sheeting, said partitions being established of flexible material and said flexible central sheet normally resting upon the base sheet.

10. A structure as set forth in claim 1 in which the bottom sheet has a heat reflective top surface and the central sheet is established of black, opaque plastic sheeting, said partitions being established of flexible material and said flexible central sheet normally resting upon the base sheet, and an air conducting opening with a closure related thereto in the top sheet to facilitate conducting air into and out of the space between the central and top sheets.

References Cited

UNITED STATES PATENTS

| 3,077,190 | 2/1963 | Allen | 126—271 |
|---|---|---|---|
| 3,146,774 | 9/1964 | Yellott | 126—271 |
| 3,236,294 | 2/1966 | Thomason | 126—271 X |
| 3,254,643 | 6/1966 | Thomason | 126—271 |
| 3,369,539 | 2/1968 | Thomason | 126—271 |
| 3,387,602 | 6/1968 | Thomason | 126—271 |

CHARLES J. MYHRE, Primary Examiner